United States Patent
McGrath et al.

(10) Patent No.: US 8,163,054 B1
(45) Date of Patent: Apr. 24, 2012

(54) AIR FILTER WITH INTERNAL FRAME SUPPORT

(75) Inventors: Todd McGrath, Rowlett, TX (US); Kenneth S. Lange, Lake Mills, WI (US); Richard Lyons, New Lexington, OH (US); Marty Lamp, Juneau, WI (US)

(73) Assignee: Glasfloss Industries, LP, Dallas, TX (US)

( * ) Notice: Subject to any disclaimer, the term of this patent is extended or adjusted under 35 U.S.C. 154(b) by 505 days.

(21) Appl. No.: 12/358,976

(22) Filed: Jan. 23, 2009

(51) Int. Cl.
*B01D 46/00* (2006.01)

(52) U.S. Cl. ......... 55/495; 55/497; 55/499; 55/DIG. 31; 95/273

(58) Field of Classification Search ............ 55/495–506; 96/15, 417–421; 95/222, 496–506
See application file for complete search history.

(56) References Cited

U.S. PATENT DOCUMENTS

| | | | |
|---|---|---|---|
| 2,058,669 A * | 10/1936 | Dollinger | 55/499 |
| 2,393,419 A | 1/1946 | Schaaf | |
| 3,093,401 A * | 6/1963 | Hagendoorn | 292/207 |
| 3,177,637 A | 4/1965 | Davis | |
| 3,447,691 A | 6/1969 | Andrews et al. | |
| 3,494,113 A * | 2/1970 | Kinney | 55/481 |
| 3,659,719 A | 5/1972 | Westlin et al. | |
| 3,992,173 A | 11/1976 | Wharton et al. | |
| 4,420,315 A | 12/1983 | Kershaw | |
| 4,464,187 A | 8/1984 | Kershaw | |
| 4,570,844 A | 2/1986 | Wysocki | |
| 4,615,804 A | 10/1986 | Wright | |
| 4,731,047 A * | 3/1988 | Lobb | 493/10 |
| 5,192,347 A * | 3/1993 | Lee | 55/359 |
| 5,512,074 A * | 4/1996 | Hanni et al. | 55/484 |
| 5,674,303 A | 10/1997 | Ter Horst | |
| 5,693,108 A | 12/1997 | Roome | |
| 5,743,927 A | 4/1998 | Osendorf | |
| 5,792,229 A * | 8/1998 | Sassa et al. | 55/497 |
| 6,099,612 A * | 8/2000 | Bartos | 55/481 |
| 6,126,707 A | 10/2000 | Pitzen | |
| 6,156,089 A * | 12/2000 | Stemmer et al. | 55/467 |
| 6,164,457 A | 12/2000 | Schlör | |
| 6,264,713 B1 * | 7/2001 | Lewis, II | 55/481 |
| 6,361,577 B1 | 3/2002 | Unrath et al. | |
| 6,406,509 B1 | 6/2002 | Duffy | |
| 6,454,826 B2 | 9/2002 | Fath et al. | |
| 6,485,538 B1 * | 11/2002 | Toyoshima | 55/490 |
| 6,502,909 B1 * | 1/2003 | Swilik et al. | 312/263 |
| 6,758,878 B2 | 7/2004 | Choi et al. | |
| 6,833,017 B2 * | 12/2004 | Quigley | 55/497 |
| 6,926,781 B2 * | 8/2005 | Duffy | 156/60 |
| 7,255,723 B2 | 8/2007 | Choi et al. | |

(Continued)

*Primary Examiner* — Duane Smith
*Assistant Examiner* — Amber Orlando
(74) *Attorney, Agent, or Firm* — Fogarty, L.L.C.

(57) ABSTRACT

An air filter having hollow support channels in its frame is disclosed. In one embodiment, the air filter comprises a support structure having a center portion and sidewalls positioned on opposite sides of the center portion, the center portion of the support structure attached to a side of a filter media, and a frame having a plurality of sections, each of the sections having a center portion and sidewalls positioned on opposite sides of the center portion, a first frame section attached to the support structure by connecting the sidewalls of first frame section to the sidewalls of the support structure to form a hollow channel between the first support structure center portion, the frame section center portion, and the sidewalls. Methods for cutting air filter sections and for attaching a frame to the air filter sections is also disclosed.

18 Claims, 16 Drawing Sheets

U.S. PATENT DOCUMENTS

| | | | |
|---|---|---|---|
| 7,258,715 B2* | 8/2007 | Cox et al. | 55/422 |
| 7,524,362 B2* | 4/2009 | Wu et al. | 96/15 |
| 7,588,629 B2* | 9/2009 | Osborne et al. | 96/129 |
| 7,905,938 B2* | 3/2011 | Whittemore | 55/480 |
| 2003/0066425 A1* | 4/2003 | Shah et al. | 95/273 |
| 2003/0089091 A1 | 5/2003 | Sundet et al. | |
| 2006/0037296 A1* | 2/2006 | Duffy | 55/495 |
| 2006/0053759 A1* | 3/2006 | Winters et al. | 55/497 |
| 2006/0201120 A1* | 9/2006 | Wu et al. | 55/495 |
| 2008/0034718 A1* | 2/2008 | Schuld et al. | 55/495 |
| 2008/0115474 A1 | 5/2008 | Volkmer | |

* cited by examiner

AIR FILTER WITH INTERNAL FRAME SUPPORT

TECHNICAL FIELD

The present invention relates generally to air filters and, more particularly, to an air filter having a support member within the air filter frame.

BACKGROUND

Air filters are used to protect ductwork and air conditioning systems from dust particles and other contaminants. It is important that the filter does not restrict the air flow while capturing the dust particles. A variety of air filters are used in heating, ventilating and/or air conditioning (HVAC) systems. A common air filter is a panel filter that uses a spun fiberglass or pleated air filter media. Such filters are relatively inexpensive and provide basic dust protection for ductwork and HVAC system components. Many air filter designs consist of a filter media held by a cardboard frame. Additional support may be provided by a metal screen or cardboard facing, wherein large openings are cut into the cardboard to allow air passage through the filter media. The cardboard facing may be integral to the cardboard frame or may be an additional element of the frame. Air filters having a metal screen are typically more expense due to the cost of the screen material. Additionally, when the metal screening is bent or twisted, the air filter may be deformed out of its original shape. While air filter having all-cardboard frames tend to be less expensive, they are also not as rigid as filters having metal screening over the filter media.

SUMMARY OF THE INVENTION

These and other problems are generally solved or circumvented, and technical advantages are generally achieved, by an air filter having internal support structures constructed in the air filter frame. The internal support structures form a hollow channel that provides rigid support of the air filter frame.

In accordance with one embodiment of the invention, an air filter comprises a filter media and a first support structure having a center portion and sidewalls positioned on opposite sides of the center portion. The center portion of the first support structure is attached to a first side of the filter media. A frame has a plurality of sections, each of the sections having a center portion and sidewalls positioned on opposite sides of the center portion. A first frame section is attached to the first support structure by connecting the sidewalls of first frame section to the sidewalls of the first support structure to form a hollow channel between the first support structure center portion, the first frame section center portion, and the sidewalls. The air filter may further comprise a second support structure having a center portion and sidewalls positioned on opposite sides of the center portion. The center portion of the second support structure is attached to a second side of the filter media. A second section of the frame is attached to the second support structure by connecting the sidewalls of second frame section to the sidewalls of the second support structure to form a hollow channel between the second support structure center portion, the second frame section center portion, and the sidewalls. The second side of the filter media may be opposite the first side of the air filter media.

The air filter may further comprise at least one reinforcing strip attached to a face of the air filter media. Each of the at least one reinforcing strips may be attached to one or more frame section sidewalls. The air filter media may be pleated. The first support structure is attached to a pleated side of the air filter media. The at least one reinforcing strip may be attached to peaks formed by the pleating of the air filter media.

The sidewalls of the first support structure may extend from the first support structure center portion in a direction generally away from the air filter media. In another embodiment, a first sidewall of the support structure extends from the support structure center portion in a direction generally away from the filter media, and a second sidewall of the support structure extends from the support structure center portion in a direction generally toward the air filter media.

The sidewalls and the center portion of the support structure may be formed from a single piece of material. The sidewalls may be formed by bending the edges of the support structure material out of the plane of the first center portion. Alternatively, each of the support structure sidewalls may be formed by folding the edges of the material away from the first support structure center portion along a crease or along two or more creases.

The first support structure, the second support structure, a third side of the filter media, and a fourth side of the filter media are attached to sections of the frame so that air is unable to pass between the filter media and the frame.

In accordance with another embodiment, a method of manufacturing an air filter component comprises providing a length of air filter material. The air filter material may be provided from a manufacturing process. The air filter material comprising a pleated filter media having a first face and a second face, support structures attached to opposite sides of the pleated filter media, at least one strut attached to peaks on the first face of the pleated filter media, and at least one strut attached to peaks on the second face of the pleated filter media. A first blade of a saw is aligned with a first peak on the first side of the pleated filter media. The first blade is used to cut across the air filter material generally along the first peak. In one embodiment, the saw is controlled cut as close to the peak as possible, but it is understood that deviations in the air filter media may make it impossible to keep the saw blade precisely on the peak. The air filter material and the saw are moved in a first direction along an assembly line, for example, that is perpendicular to a first cutting direction of the first blade.

The saw also cuts the at least one strut attached to peaks on the first face using a second saw blade and a third saw blade. The second and third saw blades are located on opposite sides of the first saw blade. The saw also cuts the at least one strut attached to peaks on the second face using a fourth saw blade and a fifth saw blade. The fourth saw blade is aligned with the second saw blade and is positioned on an opposite side of the air filter material relative to the second saw blade. The fifth saw blade is aligned with the third saw blade and is positioned on an opposite side of the air filter material relative to the third saw blade.

After cutting along the first peak, the saw is moved in a second direction that is opposite the first direction, such as moving up an assembly line to an original position. The first blade of the saw is then aligned with a second peak on the first side of the pleated filter media. The saw then uses the first blade to cut in a second cutting direction along the second peak. The saw cuts across the air filter material while the air filter material and the saw are moving in the first assembly direction.

In accordance with another embodiment, a method of manufacturing an air filter component comprises providing a length of air filter material, such as from a manufacturing process, assembly line or production line. The air filter material comprising a pleated filter media having a first face and a second face, support structures attached to opposite sides of the pleated filter media, at least one strut attached to peaks on the first face of the pleated filter media, and at least one strut attached to peaks on the second face of the pleated filter media. The air filter material is cut with a five-blade saw. The cut is made across the air filter material while the air filter material and the saw are moved in a first direction, such as along a production line, that is perpendicular to a cutting direction of the saw. A first blade of the saw is aligned with a first peak on the first side of the pleated filter media. The first blade cuts generally along the peak in a first cutting direction. Second and third blades are positioned on opposite sides of the first blade and cut the at least one strut attached to peaks on the first face. Fourth and fifth blades are respectively positioned opposite the second and third blades and cut the at least one strut attached to peaks on the second face.

After cutting along the first peak, the five-blade saw is moved in a second direction that is opposite the first direction, such as returning up the production line to a starting or original position. The first blade is then aligned with a second peak on the first side of the pleated filter media. The saw then cuts in a second cutting direction across the air filter material with the first blade. This cut is made along the second peak while moving the air filter material and the saw in the first direction.

In accordance with another embodiment, a method of manufacturing an air filter comprises providing an air filter section having a filter media and support structures attached to opposite sides of the filter media. The support structures each having a center portion and sidewalls positioned on opposite sides of the center portion. A frame assembly having a plurality of segments is provided. Each of the segments have a center portion and sidewalls positioned on opposite sides of the center portion. The air filter section is positioned so that a first side of the air filter section is located above a first frame segment. The air filter section is moved into a framing form so that the first side of the air filter section contacts the first frame segment. The framing form may be a slot, bin, chamber, compartment or void adapted to hold an air filter with a frame attached. The second frame segment is moved into contact with a second side of the air filter section and a third frame segment is moved into contact with a third side of the air filter section. The frame segments are connected, and the second and third frame segments are attached to opposite ends of the first frame segment. The movement of the second and third frame segments is caused by the movement of the air filter section into the framing form. A fourth frame segment is moved into contact with a fourth side of the air filter section. The sidewalls of the air filter section support structures are attached to sidewalls of corresponding frame segments. As a result, a hollow channel is formed between the support structure and the corresponding frame segment.

The pleated filter media may have a first face and a second face. One or more struts may be attached to peaks on the first face of the pleated filter media and to peaks on the second face of the pleated filter media. The frame assembly may have a tab section attached to one end of the frame assembly. The tab section may be attached to a second end of the frame assembly. The tab section may be tucked-in or positioned between one of the frame segments and a side of the air filter section.

In another embodiment, a method of attaching a frame to an air filter comprises providing a filter slug having a filter media and reinforcing structures attached to opposite sides of the filter media. The support structures each have a center portion and sidewalls positioned on opposite sides of the center portion. An unassembled frame having a plurality of segments is also provided. Each of the segments have a center portion and sidewalls positioned on opposite sides of the center portion. A first frame segment is positioned between a first side of the filter slug and a frame form. The filter slug is moved into contact with the first frame segment and into the framing form. Second and third frame segments are moved or rotated into contact with second and third sides of the frame slug. The rotation of the frame segments is caused by the movement of the filter slug and frame into the framing form. A fourth frame segment is rotated into contact with a fourth side of the filter slug. The sidewalls of the reinforcing structures are attached to the sidewalls of the corresponding frame segments to form a hollow channel between the reinforcing structure and the corresponding frame segment. The filter media may be pleated and have a first face and a second face. One or more support struts may be attached to peaks on the first face and second face of the pleated filter media.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention.

Figure 1:
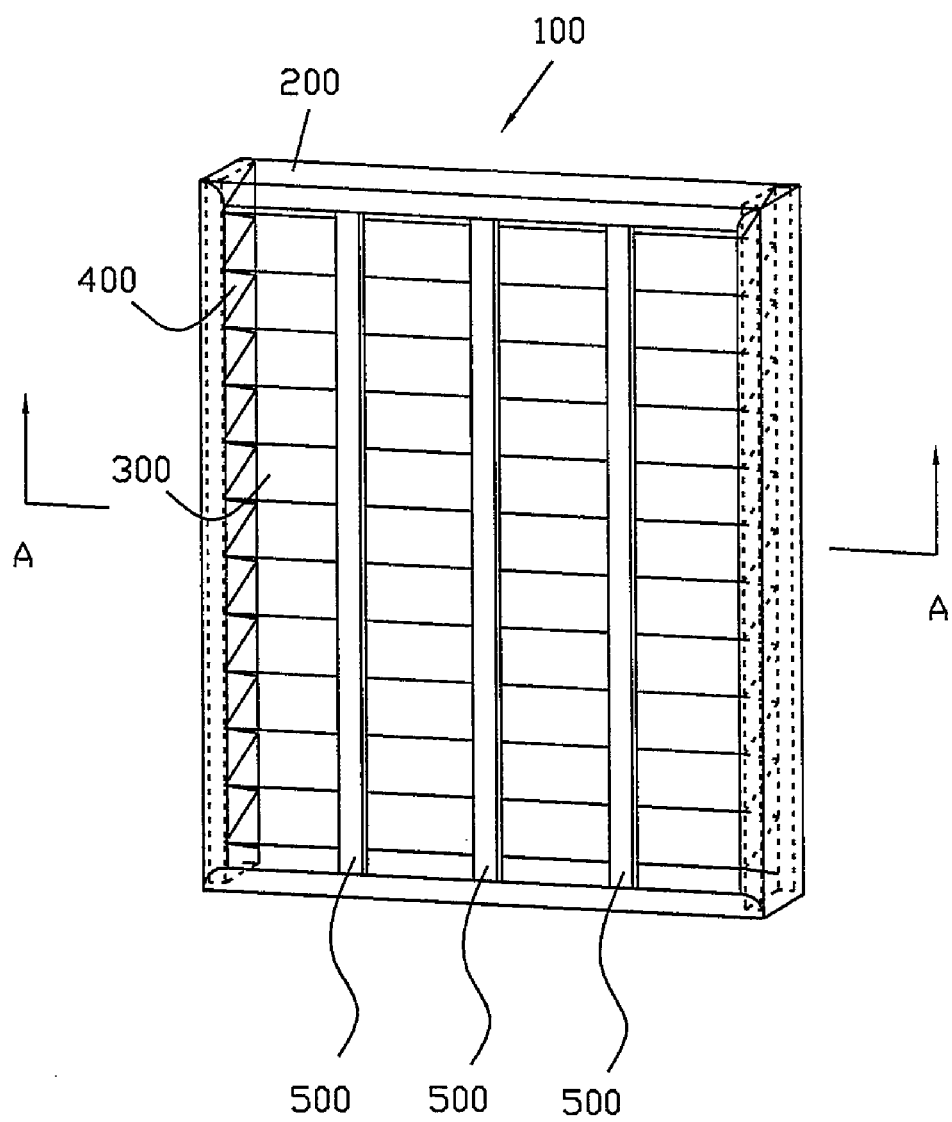
FIG. 1 is an air filter incorporating one embodiment of the invention.

FIG. 1 illustrates air filter 100 incorporating one embodiment of the present invention. Air filter 100 comprises frame 200 housing air filter media 300 mounted on internal support structure 400. Air filter media 300 is constructed of a material that allows air to pass while capturing particles passing through the material. Air filter 100 further comprises support struts 500, which may be mounted both on a front side of air filter media 300 and on a back side of air filter media 300 (not shown).

Figure 2:
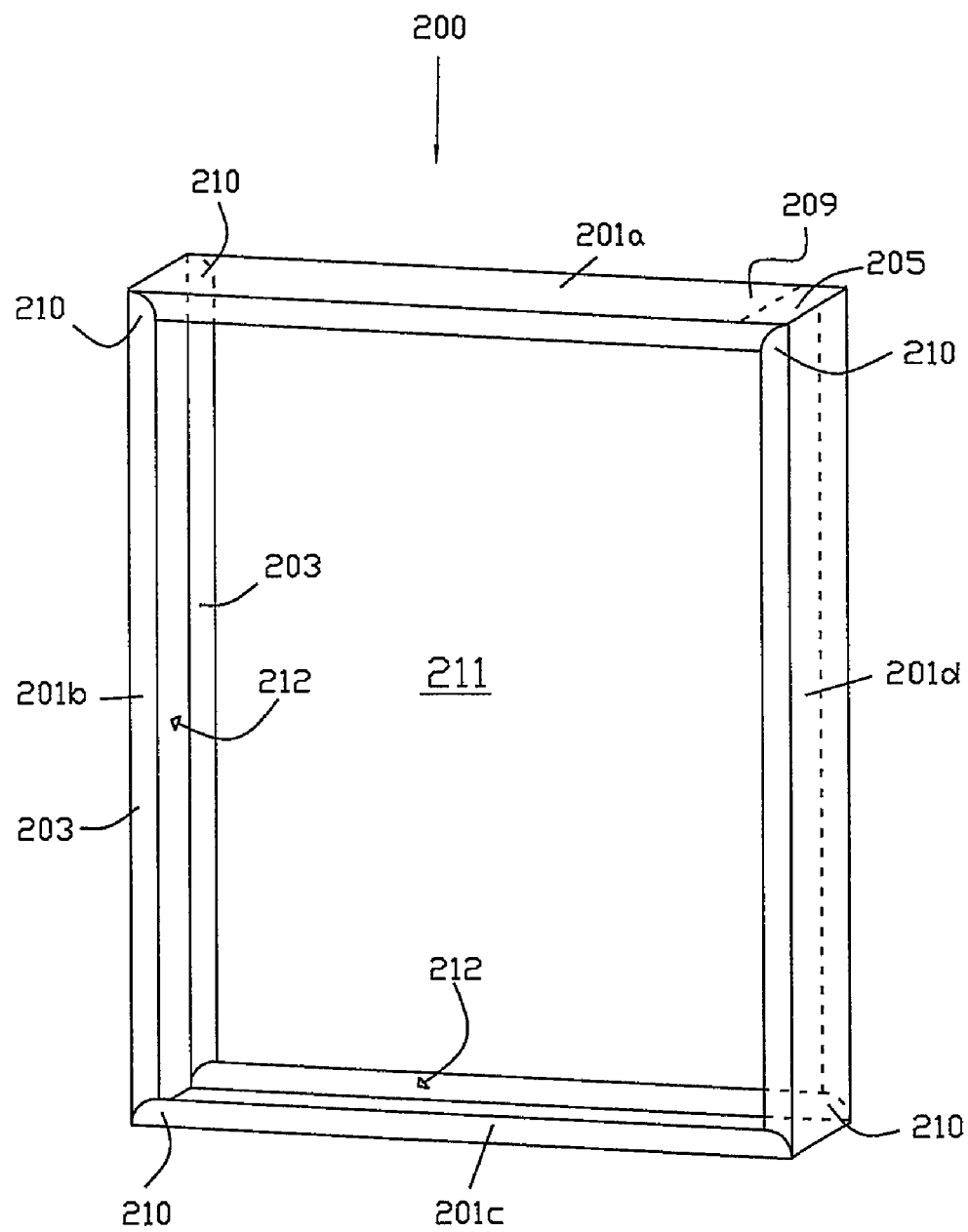
FIG. 2 is one embodiment of a frame for the air filter to FIG. 1.

FIG. 2 illustrates frame 200 standing alone without the other air filter components shown in FIG. 1. Frame 200 is preferably constructed of a single piece of material that has been cut and folded into the configuration illustrated in FIG. 2. Frame 200 forms central open area 211 and peripheral channels 212 in which air filter media 300, internal support structure 400, and support struts 500 are mounted.

Figure 3:
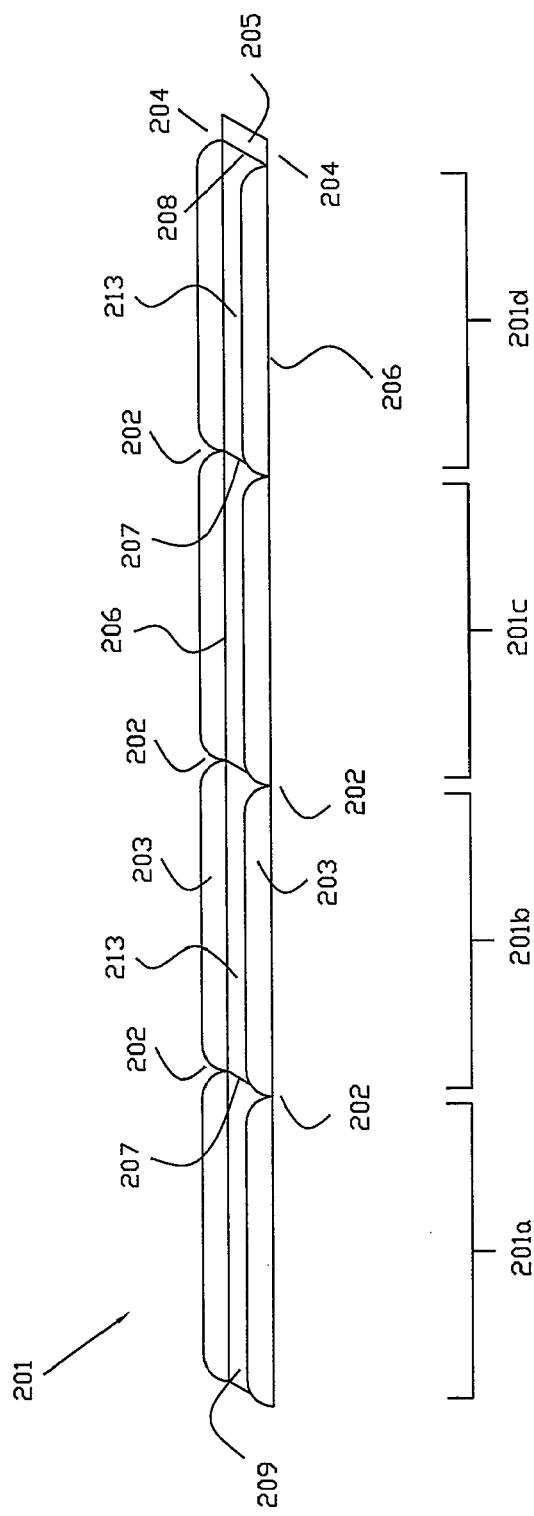
FIG. 3 is one embodiment of a partially constructed frame for use with the air filter of FIG. 1.

FIG. 3 illustrates unassembled frame 201 for use in a preferred embodiment of air filter frame 200. The frame material is cut to create notches 202, 204 and then scored or folded along creases 206, 207, 208 to form four frame segments 201a-d and end tab 205. Unassembled frame 201 is folded approximately 90° at each crease 207 to form the basic rectangular shape of frame 200. End tab 205 is folded approximately 90° along crease 208 and permanently attached to opposite end 209 of unassembled frame 201 to hold the rectangular shape of frame 200. Although shown in the upper, right-hand corner of exemplary frame 200, it will be understood that the actual location of connection between end tab and opposite end 209 may be placed on any corner of air filter 100.

Frame sidewalls 203 are formed by notches 202 and creases 206. Each frame segment 201a-d has two sidewalls 203 and central portion 213. Sidewalls 203 on each frame segment 201a-d are folded inwardly approximately 90° toward the opposite sidewall 203 to form channel 212 (FIG. 2). When unassembled frame 201 is folded into air filter frame shape 200, sidewalls 203 on adjacent segments 201a-d will overlap at area 210. It will be understood that either sidewall 203 from adjacent sections may overlap the adjacent sidewall. Moreover, the order in which sidewalls 203 overlap is not critical to the invention and may differ among corners, sidewalls and segments in a single air filter and among multiple air filters. Overlapping sidewalls 203 on adjacent frame segments 201a-d are permanently attached to each other at area 210 in each corner to hold the shape of frame 200 and channels 212.

Figure 4:
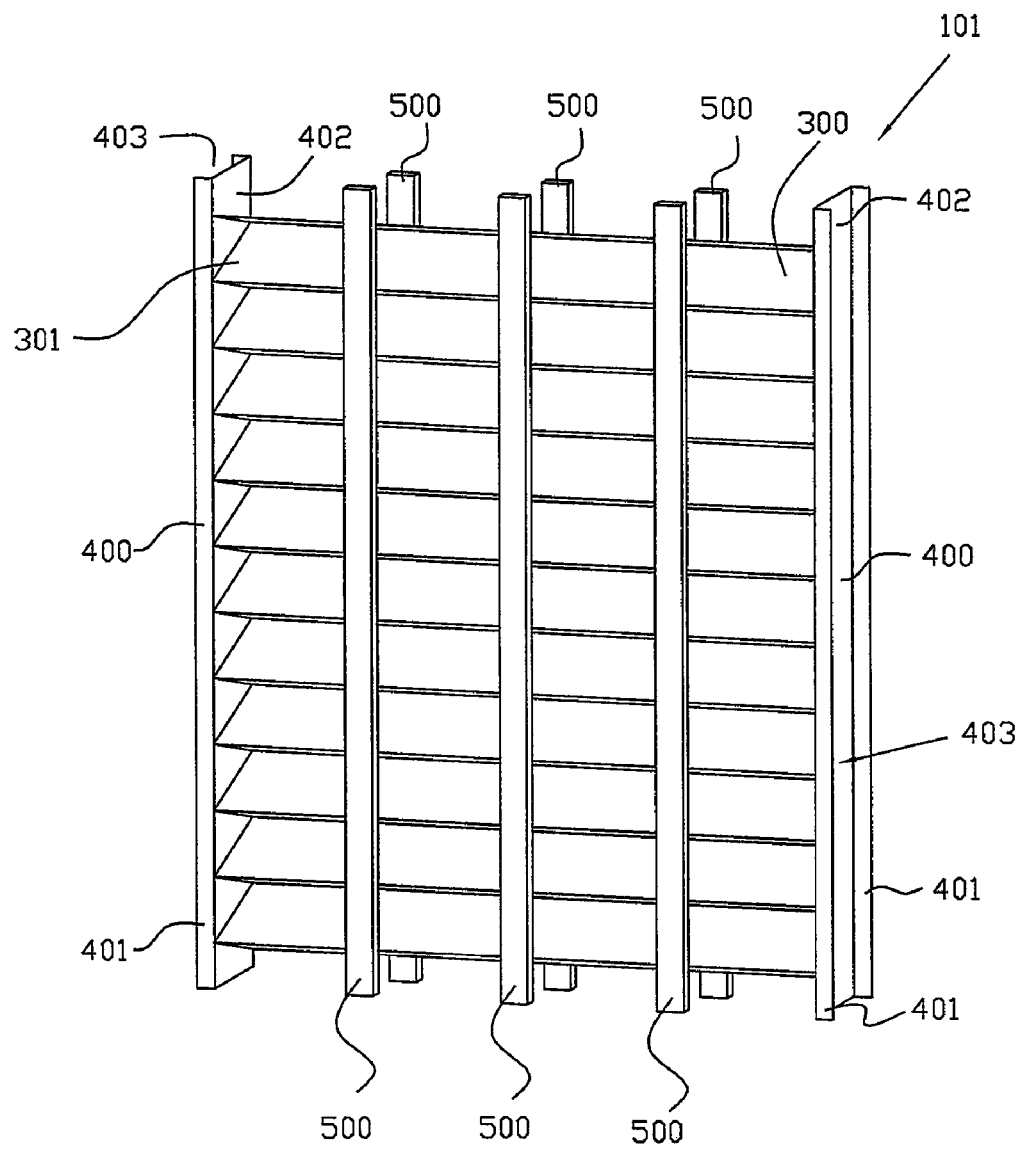
FIG. 4 is one embodiment of the internal components of the air filter of FIG. 1.
Figure 5:
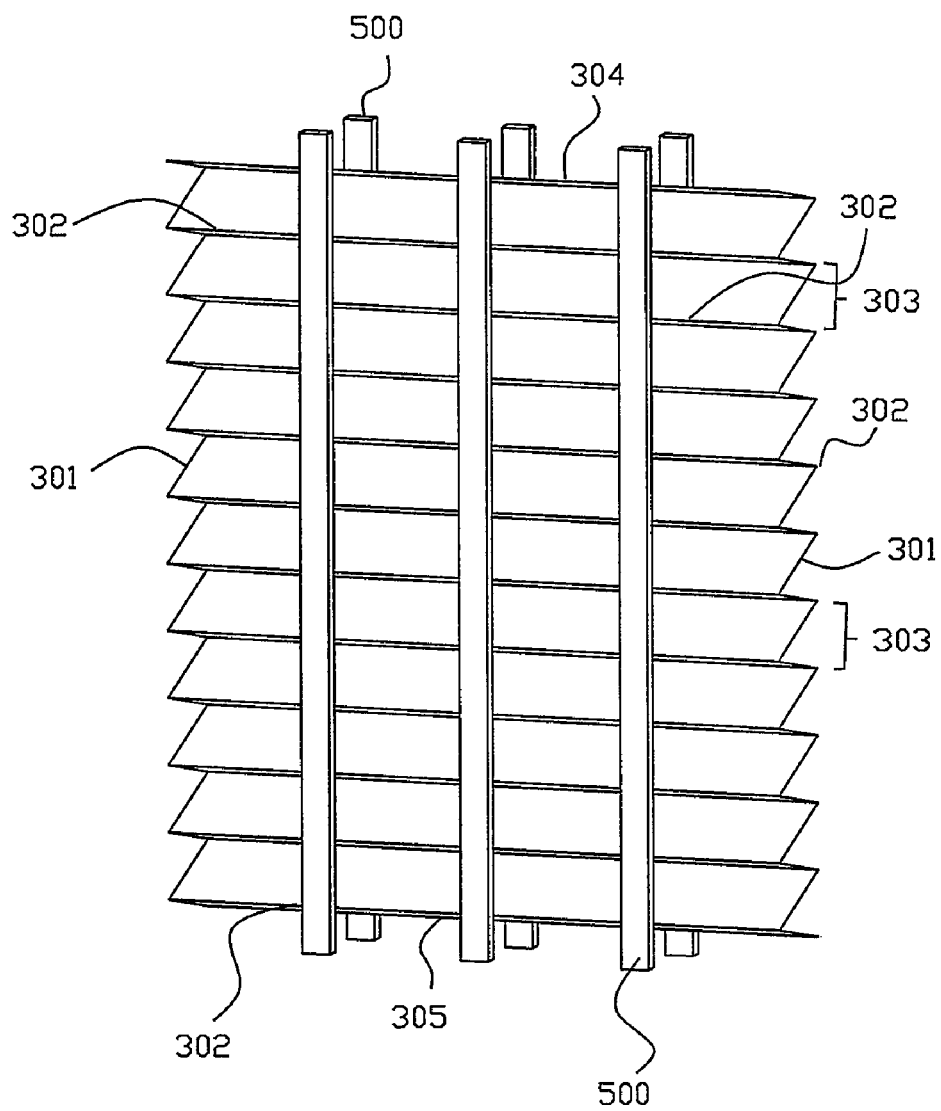
FIG. 5 is another embodiment of the internal components of the air filter of FIG. 1.

FIGS. 4 and 5 illustrate one embodiment of internal structure 101 of air filter 100 (FIG. 1). Air filter media 300 is folded to form pleats 303, each pleat 303 having peaks 302 on a front and rear face of air filter media 300. Opposite side edges 301 of air filter media 300 are attached to central portions 402 of internal support structure 400. Sidewalls 401 of internal support structure 400 extend inwardly—approximately perpendicular to central portion 402—to form channel 403. Internal support structure 400 is configured to fit within channels 212 of frame 200 (FIG. 2). Sidewalls 401 of internal support structure 400 are attached to sidewalls 203 to hold internal air filter structure 101 within frame 200. Support struts 500 are attached to peaks 302 of each pleat 303 in air filter media 300 to assist in maintaining pleat spacing. Support struts 500 are also attached to sidewalls 203 of frame 200 to provide structural support rigidity to air filter 100. Top edge 304 and bottom edge 305 of air filter media 300 may also be attached to side walls 203 or central portion 213 of frame 200.

Figure 6:
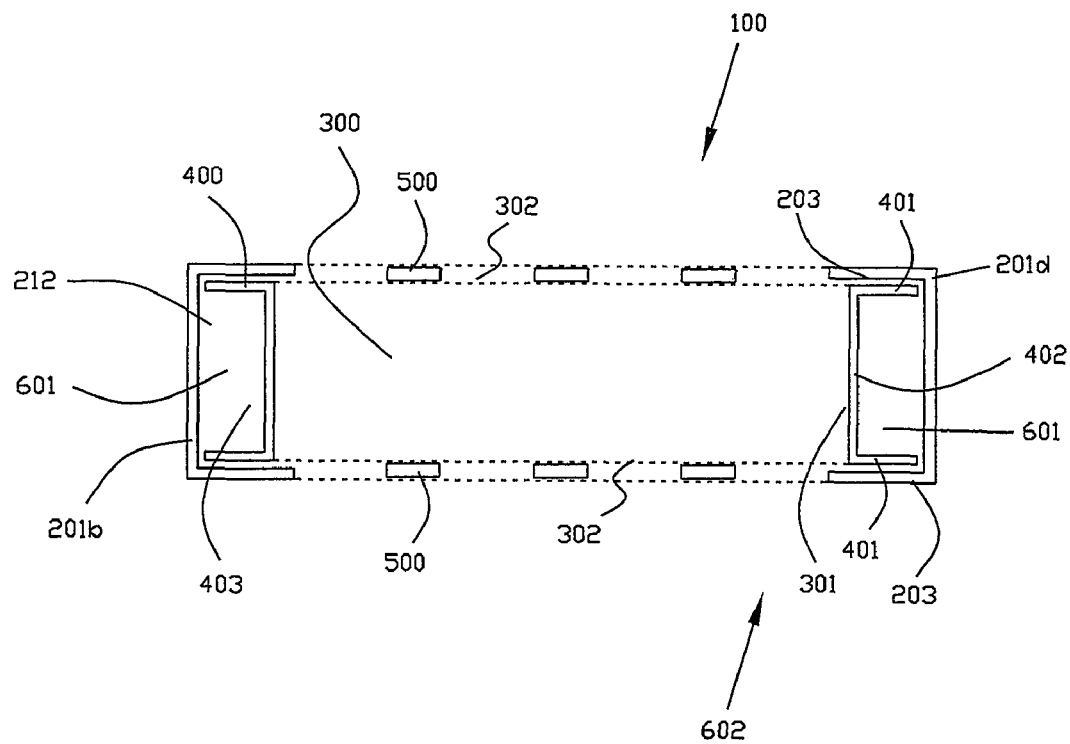
FIG. 6 is a cross-section of the air filter illustrated in FIG. 1.

FIG. 6 is a cross-section of air filter 100 (at line A-A of FIG. 1) that illustrates the relationship between internal support structures 400 and frame 200. Internal support structures 400 are adapted to fit within frame channel 212 so that the outside faces of sidewalls 401 touch the inside faces of frame sidewalls 203. Each sidewall 401 is attached to a respective sidewall 203 so that internal support structure 400 is permanently held in place within a frame segment 201b, 201d to form enclosed channel or hollow void 601. The combination of internal support structures 400 and frame segments 201b, 201d provides a rigid internal structure and eliminates air bypass around filter media 300 and inside frame channel 212 by adhering sidewall 401 to frame sidewalls 203 for air filter 100.

Figure 7:
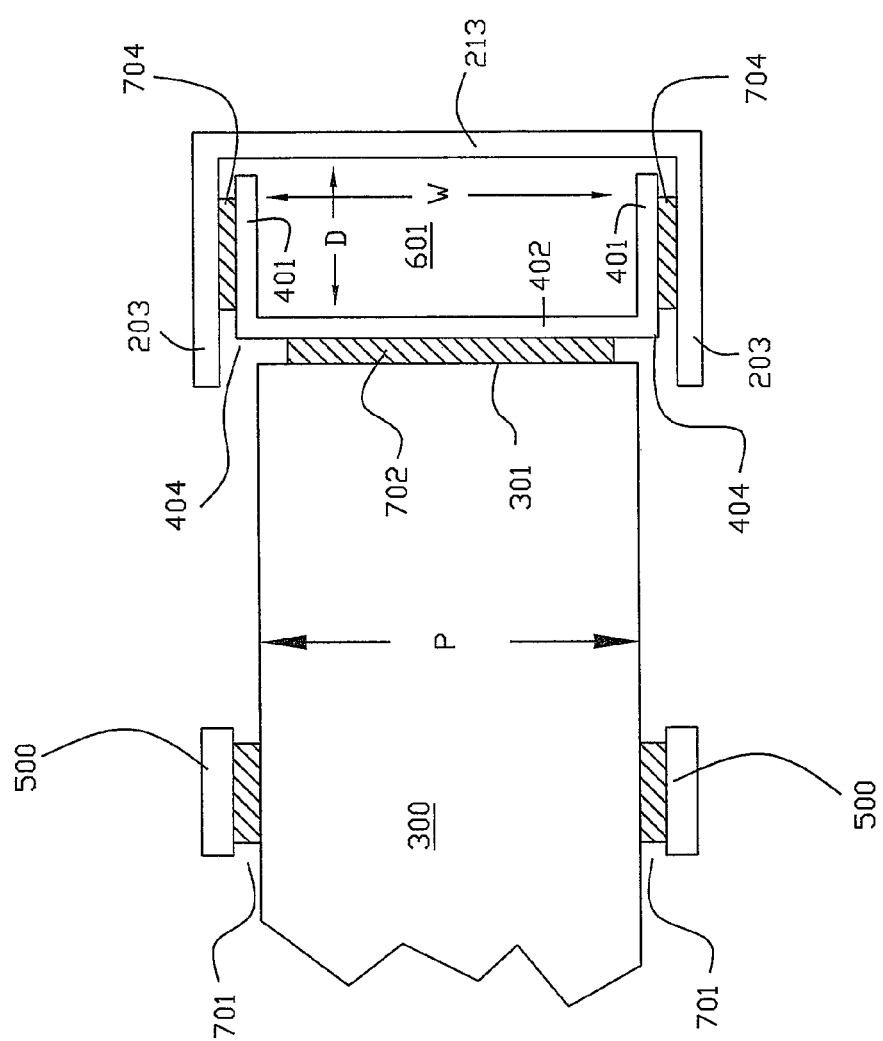
FIG. 7 is a detailed illustration of a sub-section of the air filter cross-section of FIG. 6.

FIG. 7 is an expanded view illustrating additional detail for section 602 of the cross-section shown in FIG. 6. Adhesive 701 is used to attach air filter media 300 to support struts 500. End 301 of air filter media 300 is attached to central portion 402 of internal support structure 400 using adhesive 702. Sidewalls 401 of internal support structure 400 are attached to frame sidewalls 203 using adhesive 704. Hollow void or channel 601 is formed by the combination of internal support structure 400 and frame 200. The width W of channel 601 is determined by the dimensions of central portion 402 and the separation between opposed sidewalls 401. In one embodiment, internal support structure 400 is manufactured from a single piece of material that is scored and then folded along creases 404. The width of central portion 402 is determined by the separation between creases 404, which is selected based upon the depth P of the pleats in air filter media 300. Generally, the width of central portion 402 is selected to be slightly larger than pleat depth P to ensure that all of air filter media edge 301 is sealed against central portion 402 to prevent air from passing between air media 300 and internal support structure 400.

The depth D of channel 601 is determined by the distance between internal support structure central portion 402 and frame central portion 213. Internal support structure 400 must fit within frame 200 so that sidewalls 401 can be attached to frame sidewalls 203 in a manner that prevents air from passing between internal support structure 400 and frame 200. All air passing through central open area 211 of frame 200 (FIG. 2) should be forced to pass through air filter media 300, and not be allowed to bypass filter media 300 by passing through gaps around internal support structure 400 or frame 200. In one embodiment, it is preferable to allow some capability for movement of internal support structure 400 within frame channel 212—i.e. movement along direction D—during manufacture to take into account production tolerances, such as those caused by variations in materials. For example, if air filter media is cut narrower than expected, then internal support structure 400 may not extend as deeply into frame channel 212. As a result, channel 601 may have a relatively larger depth D when sidewalls 203 and 401 are locked in place by adhesive 704 during the manufacturing process.

It will be understood by those of ordinary skill in the art that frame 200, internal support structure 400, and support struts 500 may be constructed of light-, medium-, or heavy-weight cardboard, plastic, metal, or similar materials. Moreover, the surfaces of the materials used for frame 200, internal support structure 400, and support struts 500 may be unfinished, blank, or unmarked, or may be finished, printed, stamped, or otherwise modified prior to, during or after manufacture of air filter 100. The same materials may be used to construct all of the components of frame 200, internal support structure 400, and support struts 500 or different materials may be used for various groups of components or for each individual component.

It will be further understood by those of ordinary skill in the art that where components of air filter 100 are attached to each other, such attachment may be accomplished using a wide variety of materials or methods. For example, the components may be attached using adhesive, glue, epoxy, cement, tape, welding, melting, fusion, stapling, sealing, crimping, or the like. Furthermore, more than one attachment material or method may be used to construct air filter 100.

It will be understood that air filter 100 and the components illustrated in FIGS. 1-7 are for exemplary purposes only and are not intended to represent a preferred size, scaling, or orientation. The present invention is not limited for use with filters of any particular size, dimensions, style or purpose, but may be used with any standard, common, unique, or special-order air filter. Accordingly, the outside length, width, and depth of air filter 100, as well as the length, width, and thickness of individual components of air filter 100, may be of any dimension. Additionally, although three support struts 500 are shown in air filter 100, it will be understood that any number of support struts 500, including no struts 500, may be used with the present invention. Moreover, the width, length and thickness of support struts 500 may be of any dimension. The length of support struts 500 may extend to frame 200, as shown in FIG. 1. Alternatively, one or both ends of each support strut 500 may terminate prior to touching frame 200. Support struts 500 may be attached to all, less than all, or none of the pleats 302, 303 in air filter media 300.

It will be understood by those of ordinary skill in the art, that air filter media 300 may be of any now known or later developed filter material, such as permeable materials designed to filter and remove a range of contaminants, allergens, irritants, pollutants or other particulates from the air. Such air filter media may be manufactured using materials such as polyester fibers, fabric, gauze, carbon, foam, or other now known or later developed filter material. Moreover, air filter media 300 may have any size or thickness, and the filter fibers used therein may have any length and/or density. Although example embodiments illustrated herein include a pleated air filter media, it will be understood that the air filter media may have any form or shape, including pleated media, flat media, one or more layers of media, one or more types of layered media, or the like.

Figure 8A:
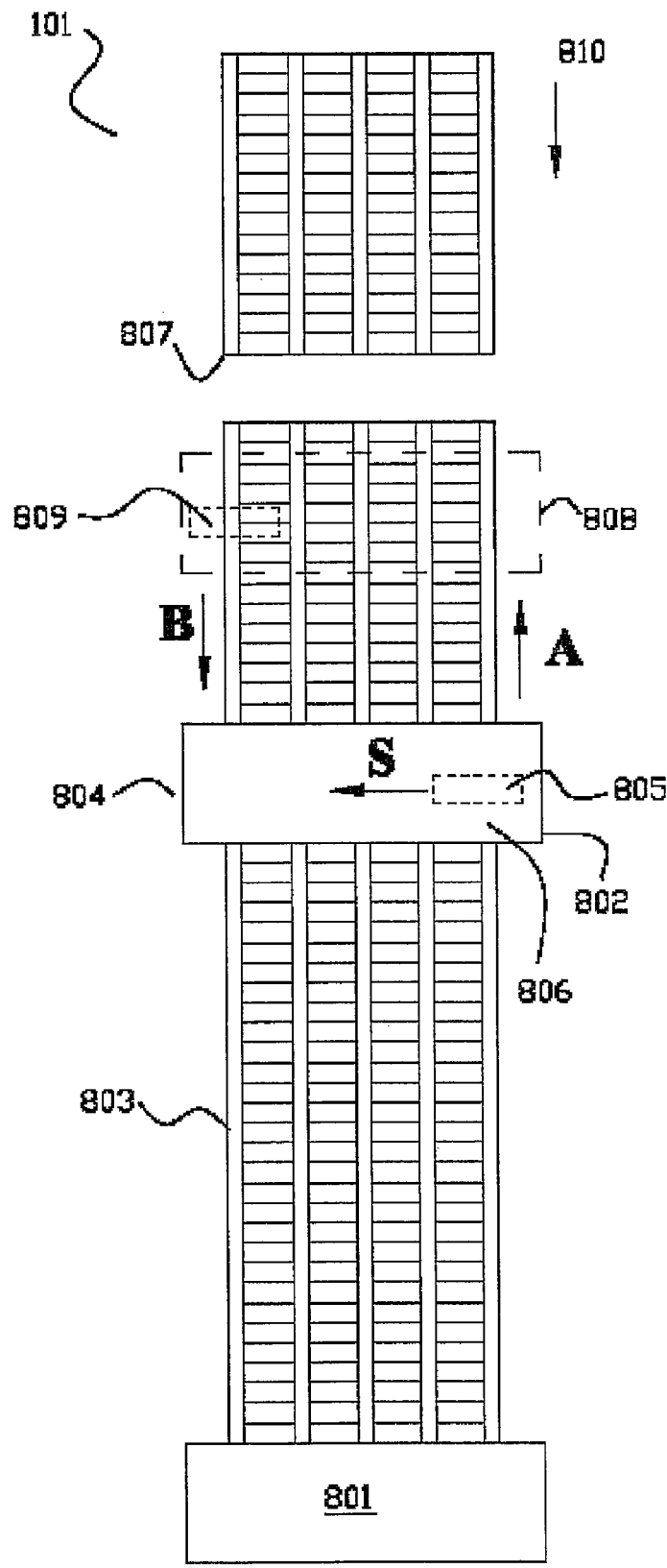
FIG. 8A illustrates a top view of a first cutting process.
Figure 8B:
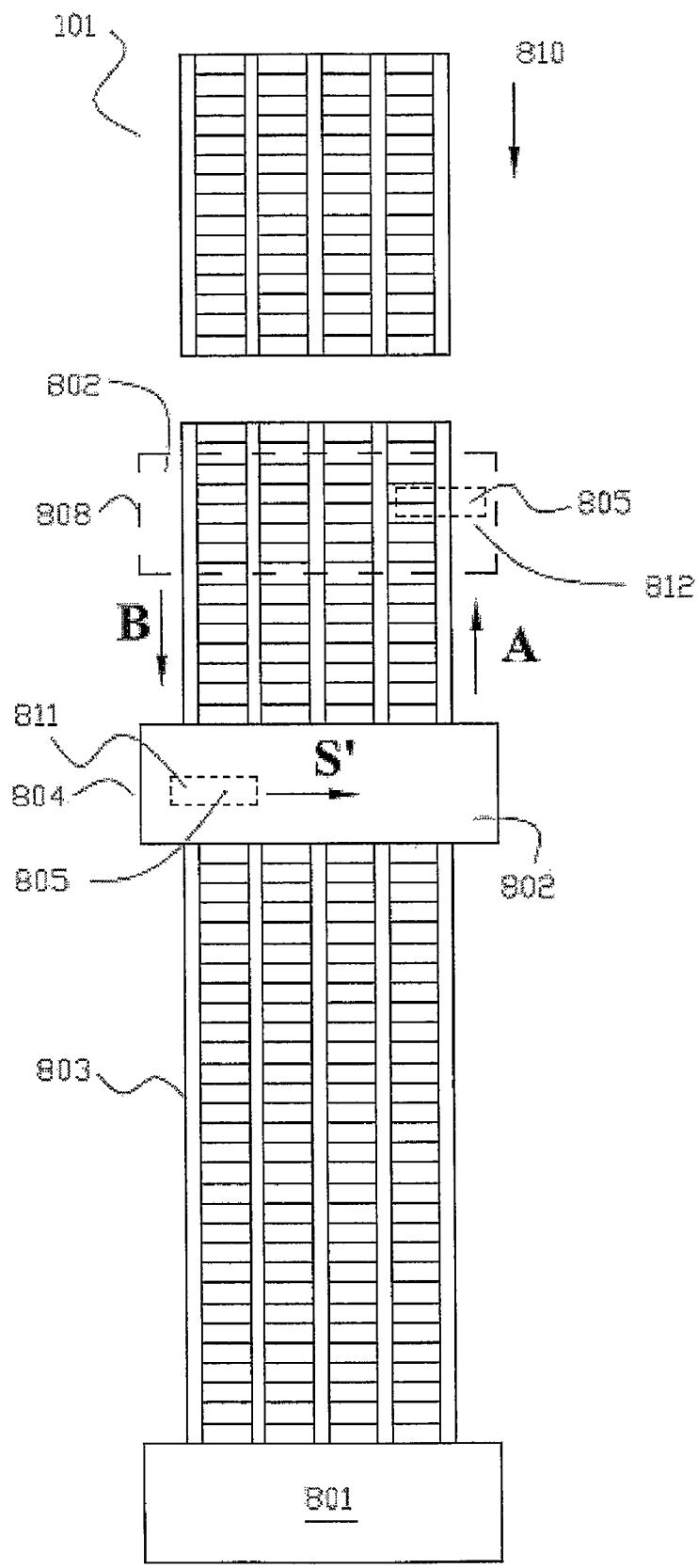
FIG. 8B illustrates a top view of a second cutting process.

FIGS. 8A and 8B illustrate the operation of saw 802 according to one manufacturing embodiment. In a preferred embodiment, a plurality of air filters 100 are manufactured in a continuous process, wherein a series of internal air filter structures 101 (or "slugs") are cut sequentially from air filter material 803, which is constructed by manufacturing process 801. Process 801 may be any fully automated, partially automated, or hand-operated process or method in which air filter media 300 is pleated, if required, and mounted on internal support structure 400 and in which support struts 500 are attached, if required or desired. A person of ordinary skill in the art will be aware of one or more methods in which such a continuous section of air filter material 803 may be constructed. Air filter slugs 101 are then combined with frames 200 to create the completed air filters 100.

In order for the process to be continuous, internal air filter slugs 101 must be cut from material 803 as the material is output from process 801. Saw 802 begins at position 804 with blade 805 at position 806. The air filter material moves along the assembly line in direction A. Saw blade 805 moves in direction S to cut off sections 101. In order to keep cut 807 parallel to the pleats in the air filter media, saw 802 must move with the air filter material 803 in direction A as cut 807 is being made. When the cut is complete, saw 802 has moved along the assembly line and ends in position 808 with blade 805 now in position 809. Saw 802 is then moved in direction B, opposite direction A, to return saw 802 to position 804.

As illustrated in FIG. 8B, instead of returning saw blade 805 to position 806 (FIG. 8A), blade 805 begins the next cut from position 811. To make the next cut, saw 805 again moves in direction A with the air filter material 803, but blade 805 moves in direction S'-opposite direction S (FIG. 8A). When the next cut is complete, saw 802 has again moved to position 808, and blade 805 ends at position 812. To begin a third cut, saw 802 returns in direction B to position 804, with blade 805 in position 806. The third and subsequent cuts are made in the same manner as described above as the process repeats itself.

Figure 9A:
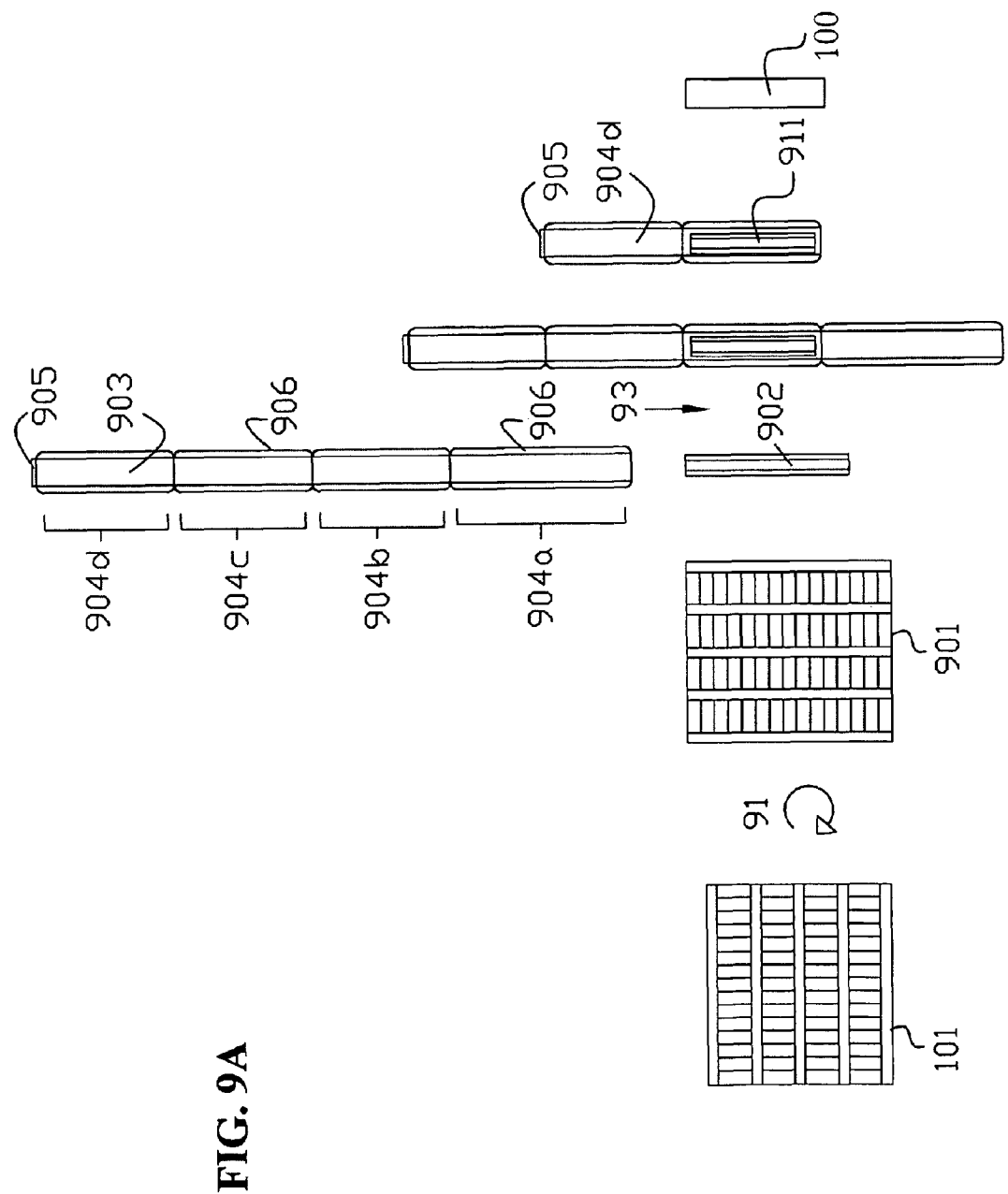
FIG. 9A illustrates a top view of an exemplary frame attachment process.
Figure 9B:
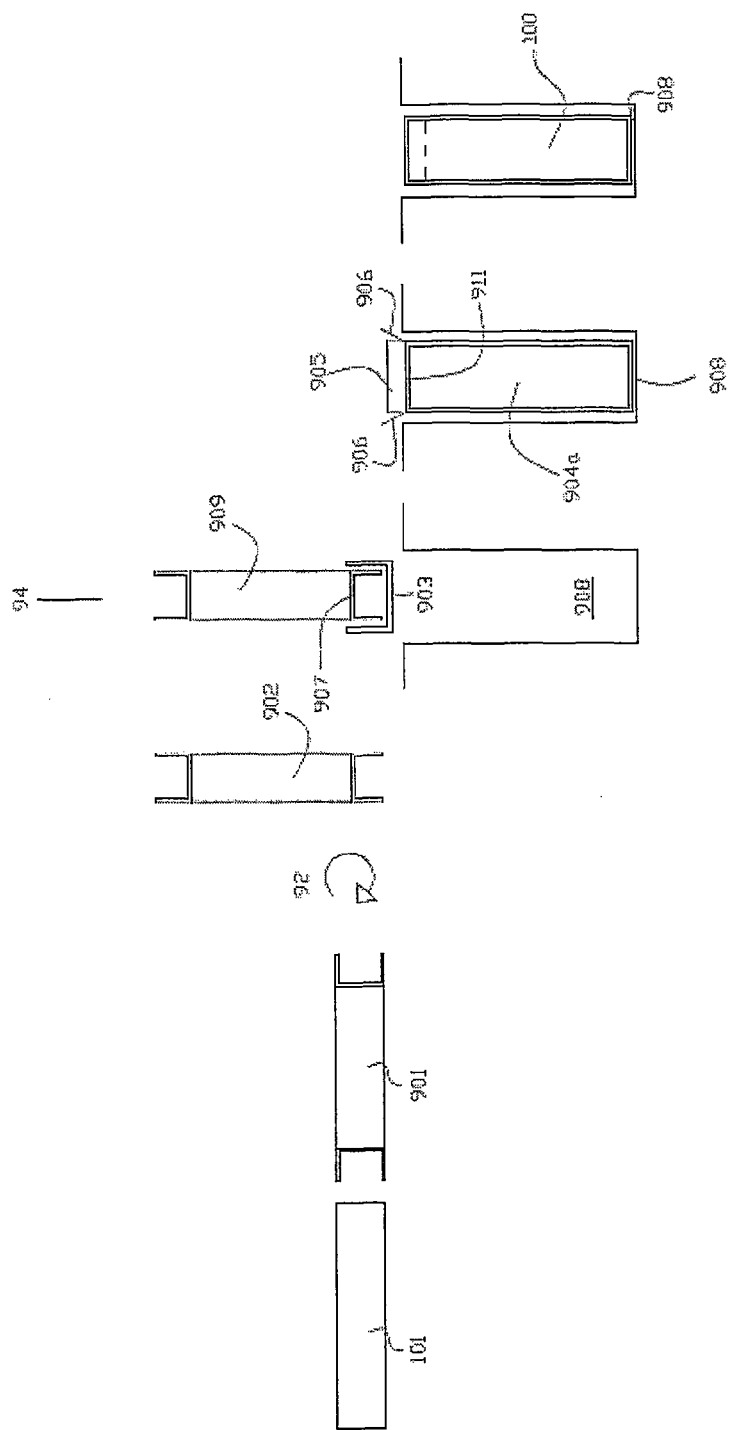
FIG. 9B illustrates a side view of an exemplary frame attachment process.
Figure 9C:
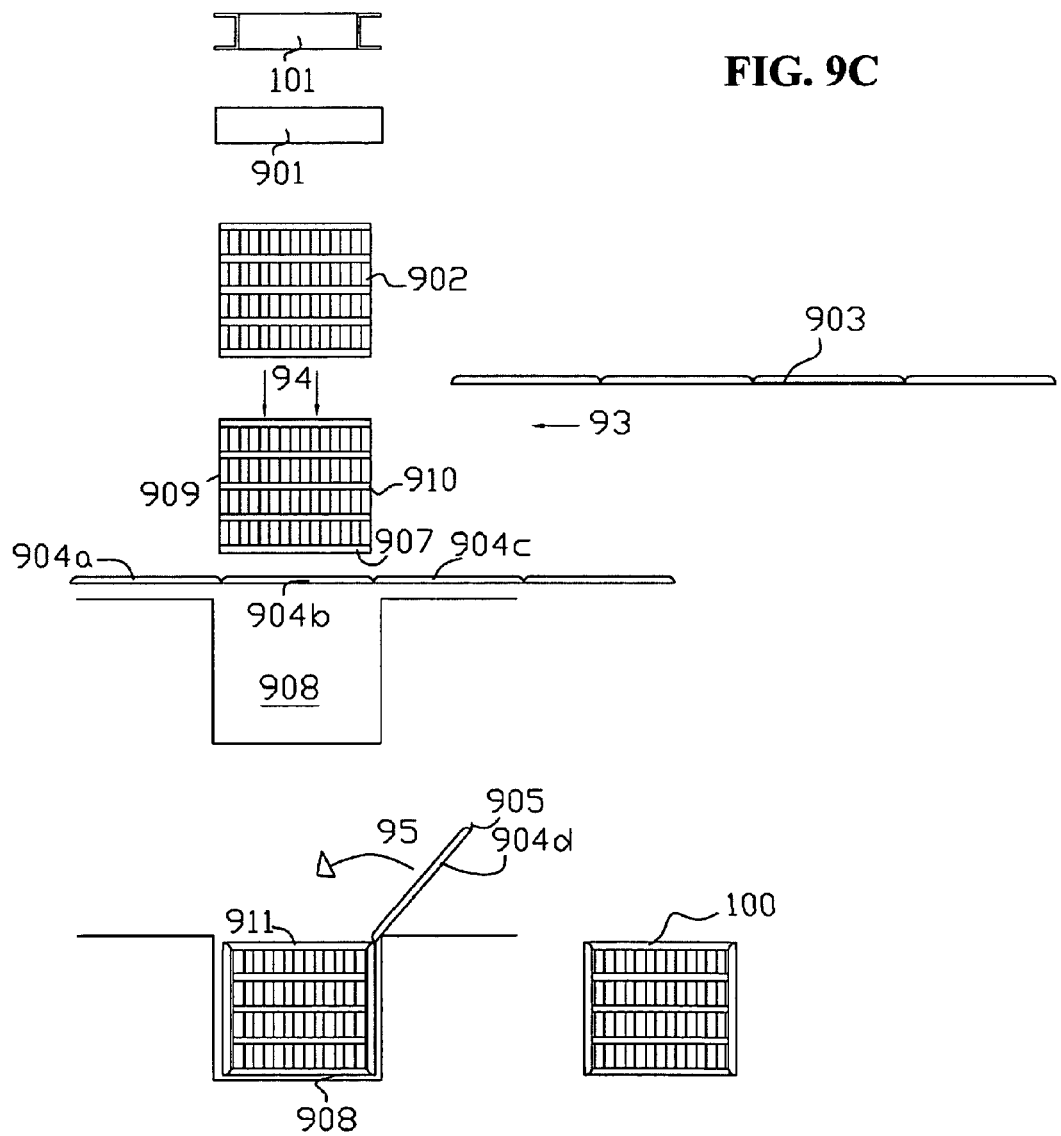
FIG. 9C illustrates an end view of an exemplary frame attachment process.

Slugs 101 corresponds to the internal components 101 (FIG. 4) of air filter 100 (FIG. 1). In one embodiment, as slugs 101 are cut by saw 802, they are further processed to add an air filter frame, such as frame 200 (FIGS. 1, 2). FIG. 9A is a top view of a frame attachment process that is applied to the air frame slugs as they leave the assembly line illustrated in FIGS. 8A and 8B. FIG. 9B is a side view of a frame attachment process that corresponds to the assembly side view illustrated in FIGS. 8A and 8B. FIG. 9C is a view of the frame attachment process oriented in the direction of arrow 810 (FIGS. 8A and 8B) at the end of the air filter slug assembly line.

In the illustrated embodiment, slug 101 is first rotated 90° horizontally (91) to position 901 and then rotated 90° vertically (92) to position 902. Slug 902 is then positioned in line with unassembled frame 903, which corresponds to unassembled frame 201 (FIG. 3) in this example. Unassembled frame 903 is a single material that has been divided, for example, by folds or crease, into segments 904a-d and end tab 905. Sidewalls 906 are also formed on unassembled frame 903.

Unassembled frame 903 is moved in direction 93 under slug 902 so that frame segment 904b is aligned under slug 902. It will be understood that, in other embodiments, slug 902 may be moved over frame assembly 903 or that slug 902 may be aligned over a different segment of frame assembly 903. Glue, adhesive, or other attachment means may be applied to frame 903, sidewalls 906 and/or slug 902 as frame assembly 903 is moved under slug 902. Slug 902 is then forced downward in direction 94 so that end 907 of slug 902 contacts frame segment 904b. Slug 902 and frame assembly 903 are forced together and down into bin 908. As described above, slug end 907 is formed by the internal support structure 400 having sidewalls 401 (FIG. 4). Sidewalls 401 on slug end 907 are attached to frame sidewalls 906 on segment 904b as the assembly is formed into bin 908. Additionally, as the assembly is lowered into bin 908, frame segments 904a and 904c are forced upward and into contact with slug ends 909 and 910. Frame segments 904a and 904c are attached to the air filter media at slug ends 909 and 910.

Frame segment 904d is then rotated in direction 95 and attached to slug end 911. Similar to slug end 907, slug end 911 is also formed by the internal support structure 400 having sidewalls 401 (FIG. 4). Sidewalls 401 on slug end 911 are attached to frame sidewalls 906 on segment 904d. In a preferred embodiment, end tab 905 is tucked inside of and attached to the end of frame segment 904a to form the completed frame and completed air filter 100.

It will be understood that the support channels formed between the frame and internal support structure are not limited to the example embodiment disclosed above with respect to FIGS. 9A-9C, but may be created using structures having may different configurations. In particular, although slug 101 is illustrates as having internal support structure 400 with sidewalls 401, air filter slugs 101 having any or no such internal support structures can be used in connection with the framing process illustrated in FIGS. 9A-9C. Moreover, air filter internal slugs 101 having any number or style of support struts 500—or no support struts 500—can be used in connection with the framing process illustrated in FIGS. 9A-9C. Additionally, although air filter slugs 101 used in connection with the framing process illustrated in FIGS. 9A-9C are shown with pleated air filter media, or any other pleated or unpleated air filter media of any thickness or construction may be used.

Figure 10A:
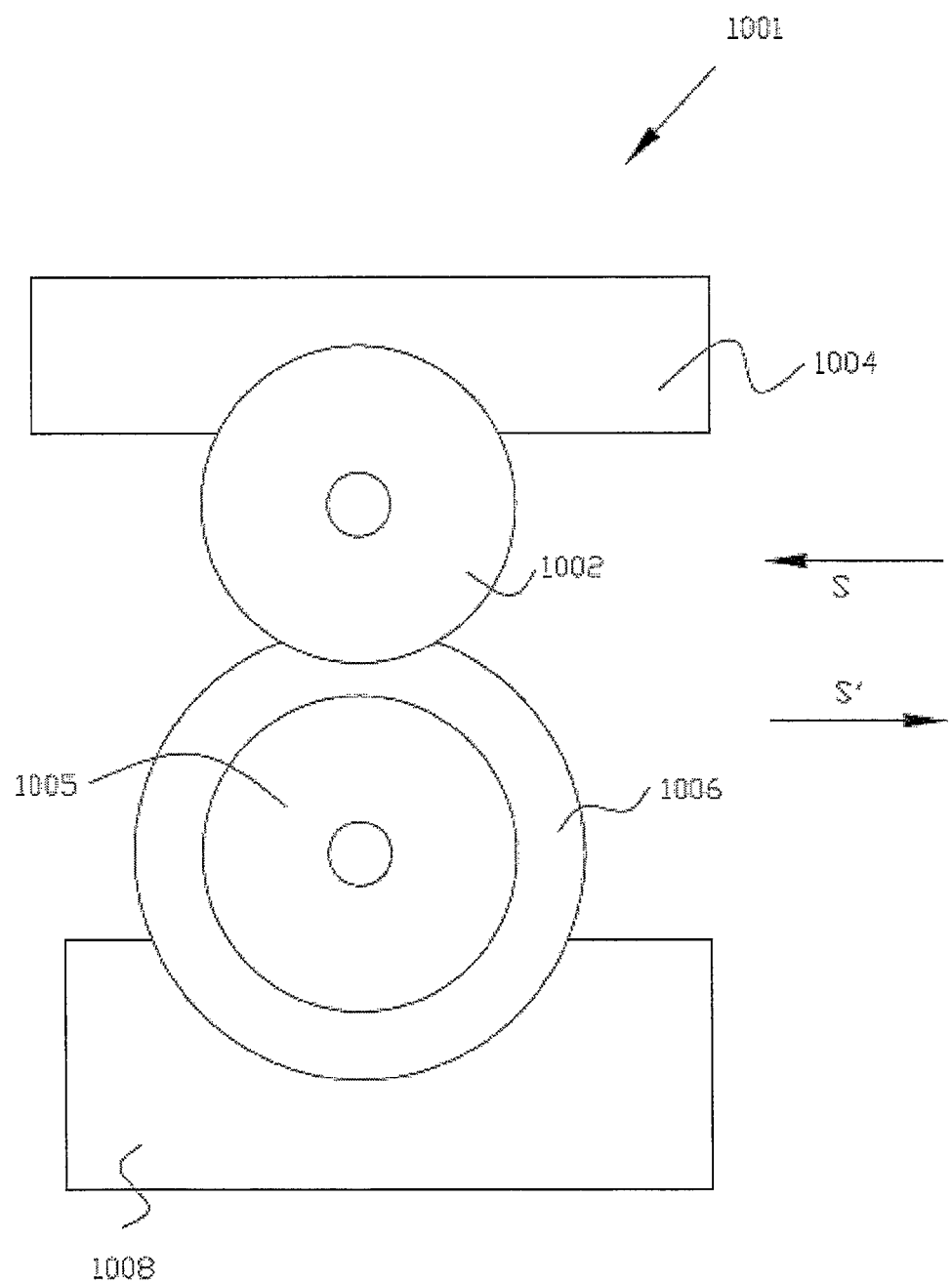
FIG. 10A illustrates an exemplary saw used in one embodiment of a cutting process.
Figure 10B:
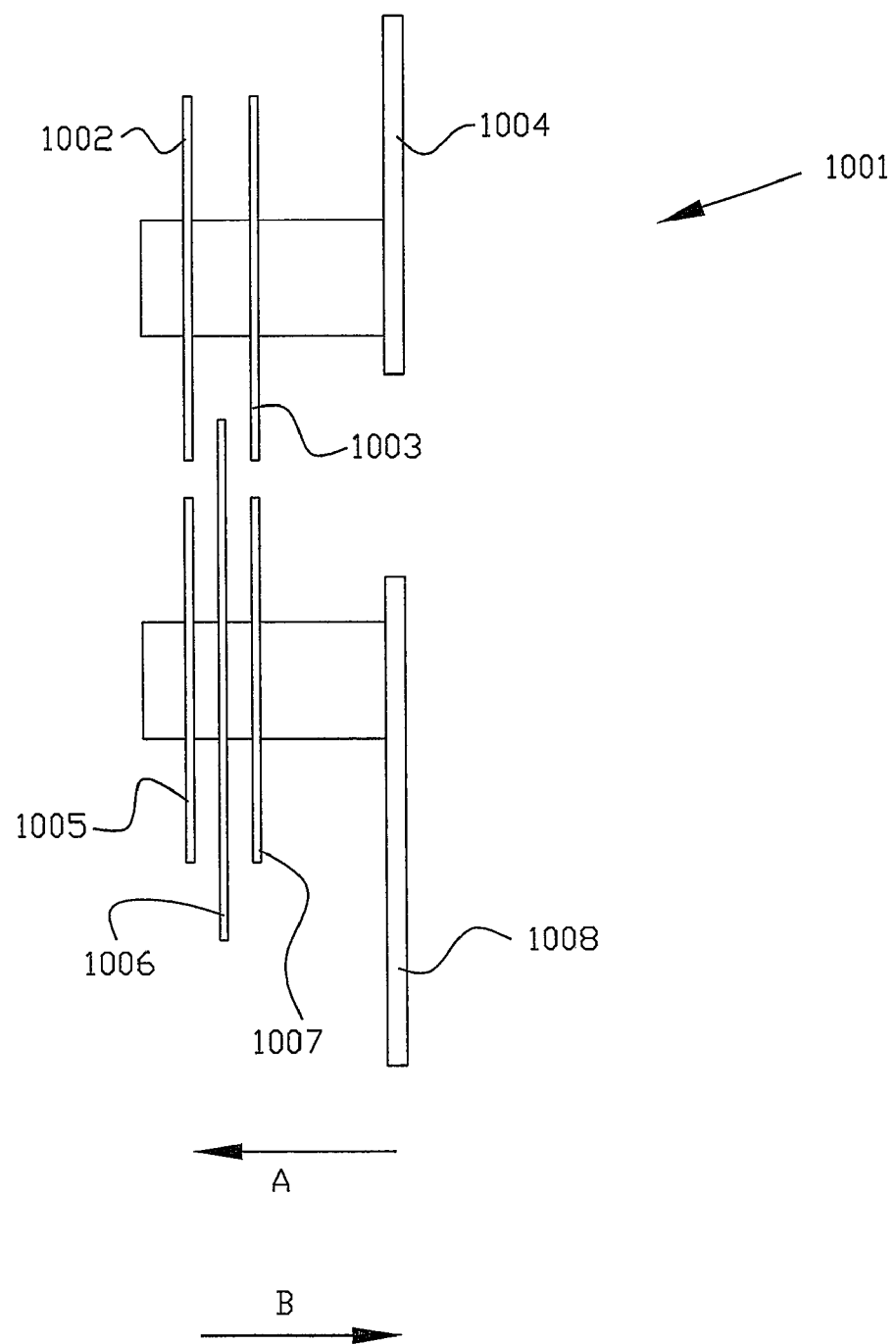
FIG. 10B illustrates another view of an exemplary saw.

FIGS. 10A and 10B illustrate side and end views of exemplary saw 1001 assembly used in embodiments of the invention. Saw assembly 1001 may be used as components of saw 802 and blade 805 (FIGS. 8A and 8B) in embodiments of an air filter slug manufacturing process. Top saw blades 1002 and 1003 are mounted on top saw assembly 1004, which may include motors, gears, drives or other components (not shown) to position, rotate and control saw blades 1002 and 1003. Bottom saw blades 1005, 1006 and 1007 are mounted on bottom saw assembly 1008, which may include motors, gears, drives or other components (not shown) to position, rotate and control saw blades 1005, 1006 and 1007.

As discussed above with respect to FIGS. 8A and 8B, air filter material 803 is cut into slugs 101. Saw assembly 1001 may be used in such a cutting process. In one embodiment, center bottom blade 1006 is aligned with a peak (302, FIG. 5) in the pleated filter media material. Saw assembly 1001 may move in direction S so that blade 1006 cuts across air filter material 803 at peak 302. At the same time, blades 1002 and 1003 cut support struts 500 on a top side of air filter material 803, and blades 1005 and 1007 cut support struts 500 on a bottom side of air filter material 803. While these cuts are being made, saw assembly 1001 may move in direction A at the same speed as the movement of air filter material 803 to keep center blade 1006 aligned with a peak 302. After traversing from one side of air filter material 803 to the other side in direction S, an air filter slug 101 is created. Saw assembly 1001 may then be moved in direction B to align center blade 1006 with a second pleat peak (302). The interval between peaks 302 that are selected for cutting is preferably selectable and allows for a variable length of air filter slug 101. After aligning with the second pleat peak 302, saw assembly 1001 moves in direction S' from one side of air filter material 803 to the other side to create a second air filter slug 101. This process may be repeated to create additional slugs 101 from a continuous length of air filter material 803.

Figure 11:
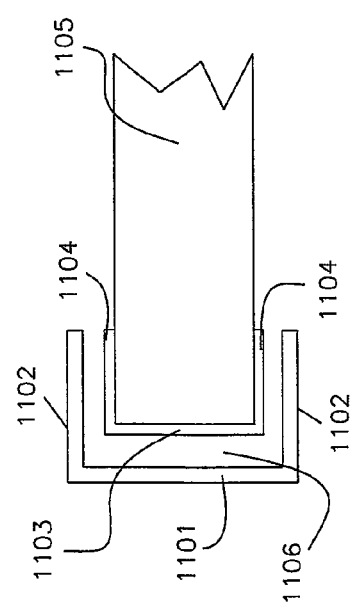
FIG. 11 illustrates an alternative embodiment of an air filter frame attached to an internal support structure.

FIG. 11 illustrates an alternative embodiment of a support channel for an air filter. The support channel illustrated in the embodiment of FIG. 11 is formed using a rectangular, U-shaped frame and internal support structure that are oriented in the same direction. Frame 1101 has sidewalls 1102. Internal support structure 1103 is attached to air filter media 1105. Internal support structure 1103 further includes sidewalls 1104. Frame sidewalls 1102 are attached to internal structure sidewalls 1104 to form channel 1106. Although sidewalls 1104 are shown flush with the filter media 1105 in FIG. 11, it will be understood that sidewalls 1104 are not required to be attached to filter media 1105. In other embodiments, sidewalls 1104 may be offset from filter media 1105 so that a gap is created therebetween.

Figure 12:
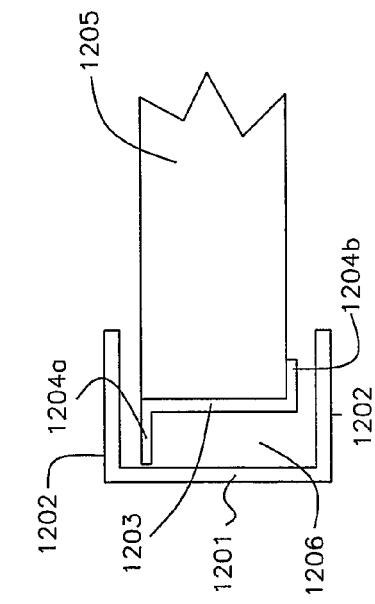
FIG. 12 illustrates an alternative embodiment of an air filter frame attached to an internal support structure.

FIG. 12 illustrates an alternative embodiment of a support channel for an air filter. The support channel illustrated in the embodiment of FIG. 12 is formed using a U-shaped frame and a rectangular internal support structure with sidewalls that are oriented in opposite directions. Frame 1201 has sidewalls 1202. Internal support structure 1203 is attached to air filter media 1205. Internal support structure 1203 further includes sidewalls 1204a and 1204b. Frame sidewalls 1202 are attached to internal structure sidewalls 1204a and 1204b to form channel 1206. Although sidewall 1204a is shown touching the center section of frame 1201 in FIG. 12, it will be understood that internal support structure 1203 may be further offset away from frame 1201 so that sidewall 1204a does not touch the center section of frame 1201. Although sidewall 1204b is shown flush with filter media 1505 in FIG. 12, it will be understood that sidewall 1204b is not required to be attached to filter media 1205. In other embodiments, sidewall 1204b may be offset from filter media 1205 so that a gap is created therebetween.

Figure 13:
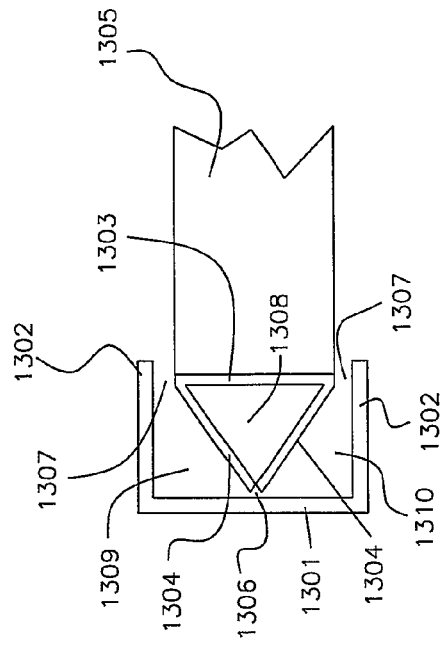
FIG. 13 illustrates an alternative embodiment of an air filter frame attached to an internal support structure.

FIG. 13 illustrates an alternative embodiment of a support channel for an air filter. The support channel illustrated in the embodiment of FIG. 13 is formed using a rectangular, U-shaped frame in combination with an internal support structure that is oriented in the opposite direction similar to FIG. 7. However, in the embodiment of FIG. 13, the sidewalls of the internal support structure are folded towards each other so that they touch or nearly touch. Frame 1301 has sidewalls 1302. Internal support structure 1303 is attached to air filter media 1305. Internal support structure 1303 further includes sidewalls 1304. Sidewalls 1304 are bent inwards so that they contact the center portion of frame 1301 at point 1306. Internal sidewalls 1304 are attached to frame 1301 at point 1306, such as by using adhesive or glue. Internal support structure 1303 may also be attached to frame sidewalls 1302 at points 1307, such as by using adhesive or glue. The connections between frame 1301 and internal structure 1303 form three channels 1308, 1309 and 1310. In alternative embodiments, internal structure 1303 is attached to frame 1301 only at point 1306 or only at points 1307. Although sidewalls 1304 are shown touching the center section of frame 1301 in FIG. 13, it will be understood that internal support structure 1303 may be further offset away from frame 1301 so that sidewalls 1304 do not touch the center section of frame 1301.

Figure 14:
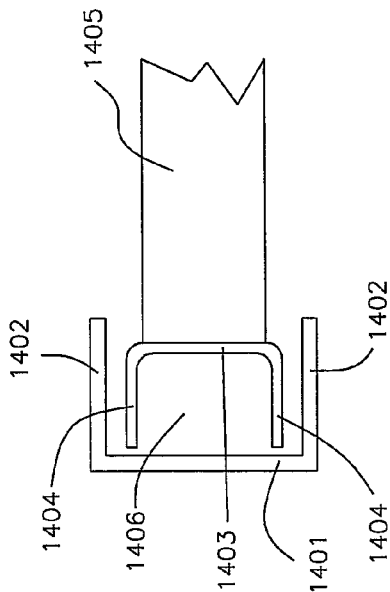
FIG. 14 illustrates an alternative embodiment of an air filter frame attached to an internal support structure.

FIG. 14 illustrates an alternative embodiment of a support channel for an air filter. The support channel illustrated in the embodiment of FIG. 14 is formed using a rectangular, U-shaped frame and a generally curved internal support structure that are oriented in opposite directions. Frame 1401 has sidewalls 1402. Internal support structure 1403 is attached to air filter media 1405. Internal support structure 1403 further includes sidewalls 1404. Frame sidewalls 1402 are attached to internal structure sidewalls 1404 to form channel 1406. This embodiment is similar to the embodiment disclosed above in FIG. 7, but instead sidewalls 1404 are formed by bending internal structure 1403 instead of by creasing or folding. Although sidewalls 1404 are shown touching the center section of frame 1401 in FIG. 14, it will be understood that internal support structure 1403 may be further offset away from frame 1401 so that sidewalls 1404 do not touch the center section of frame 1401.

Figure 15:
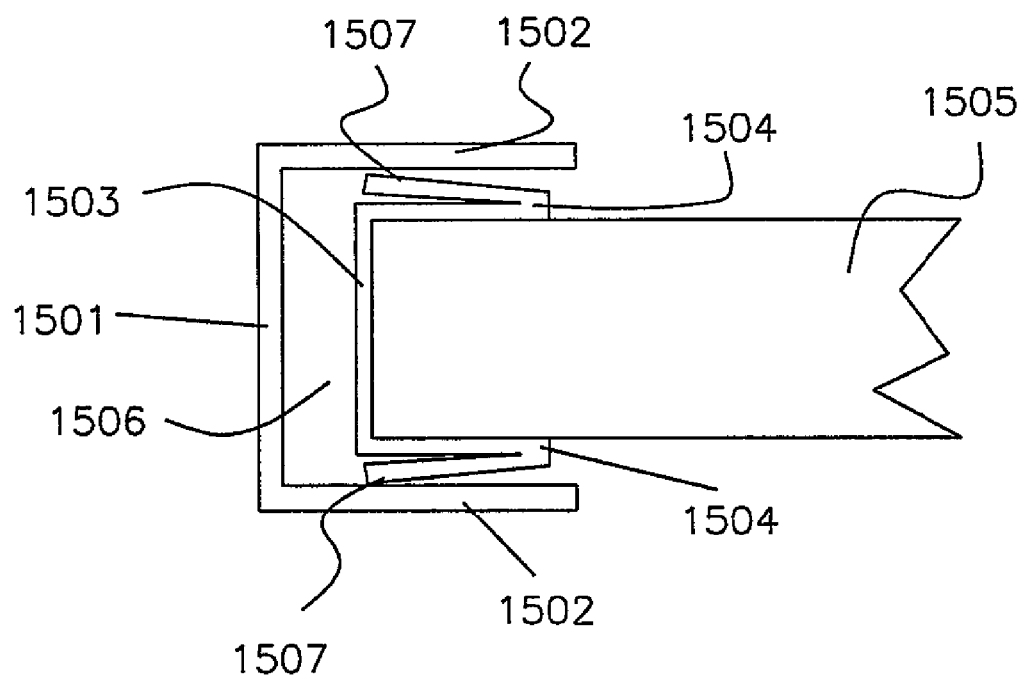
FIG. 15 illustrates an alternative embodiment of an air filter frame attached to an internal support structure.

FIG. 15 illustrates another alternative embodiment of a support channel for an air filter. The support channel illustrated in the embodiment of FIG. 15 is formed using a rectangular, U-shaped frame and an internal support structure having pleated sidewalls. Frame 1501 has sidewalls 1502. Internal support structure 1503 is attached to air filter media 1505. Internal support structure 1503 further includes sidewalls 1504, which are pleated one or more times. The pleated sidewalls 1504 may have some spring-like action that causes outside pleat 1507 to push against frame sidewall 1502 to provide an improved attachment. Channel 1506 is formed between internal support structure 1502, frame 1501, and sidewalls 1502. Although sidewalls 1504 are shown flush with the filter media 1505 in FIG. 15, it will be understood that sidewalls 1504 are not required to be attached to filter media 1505. In other embodiments, sidewalls 1504 may be offset from filter media 1505 so that a gap is created therebetween.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An air filter, comprising:
   a filter media;
   a first support structure having a center portion and sidewalls positioned on opposite sides of the center portion, the center portion of the first support structure attached to a first side of the filter media; and
   a frame having a plurality of sections, each of the sections having a center portion and sidewalls positioned on opposite sides of the center portion, a first frame section attached to the first support structure by connecting the sidewalls of the first frame section to the sidewalls of the first support structure to form a hollow channel between the first support structure center portion and the first frame section center portion, and between the sidewalls of the first support structure.

2. The air filter of claim 1, further comprising:
   a second support structure having a center portion and sidewalls positioned on opposite sides of the center portion, the center portion of the second support structure attached to a second side of the filter media; and
   a second section of the frame attached to the second support structure by connecting the sidewalls of second frame section to the sidewalls of the second support structure to form a hollow channel between the second support structure center portion, the second frame section center portion, and the sidewalls.

3. The air filter of claim 2, wherein the second side of the filter media is located on a side opposite the first side of the air filter media.

4. The air filter of claim 1, further comprising:
   at least one reinforcing strip attached to a face of the air filter media, each of the at least one reinforcing strips attached to one or more frame section sidewalls.

5. The air filter of claim 1, wherein the air filter media is pleated, and wherein the first side of the air filter media is a pleated side of the air filter media.

6. The air filter of claim 1, wherein the air filter media is pleated, and wherein at least one reinforcing strip is attached to peaks formed by the pleating of the air filter media.

7. The air filter of claim 1, wherein the first support structure sidewalls extend from the first support structure center portion in a direction generally away from the air filter media.

8. The air filter of claim 1, wherein a first sidewall of the first support structure extends from the first support structure center portion in a direction generally away from the filter media, and wherein a second sidewall of the first support structure extends from the first support structure center portion in a direction generally toward the air filter media.

9. The air filter of claim 1, wherein the first support structure sidewalls and the first support structure center portion are formed from a single piece of material, and wherein the first support structure sidewalls are formed by bending the edges of the material out of the plane of the first support structure center portion.

10. The air filter of claim 1, wherein the first support structure sidewalls and the first support structure center portion are formed from a single piece of material, and wherein each of the first support structure sidewalls are formed by folding the edges of the material away from the first support structure center portion along a crease.

11. The air filter of claim 1, wherein the first support structure sidewalls and the first support structure center portion are formed from a single piece of material, and wherein each of the first support structure sidewalls are formed by folding the edges of the material along two or more creases.

12. The air filter of claim 2, wherein the first support structure, the second support structure, a third side of the filter media, and a fourth side of the filter media are attached to sections of the frame so that air is unable to pass between the filter media and the frame.

13. A method of manufacturing an air filter, comprising:
   providing an air filter section comprising a filter media and support structures attached to opposite, pleated sides of the filter media, the support structures each having a center portion and sidewalls positioned on opposite sides of the center portion;
   providing a frame assembly having a plurality of segments, each of the segments having a center portion and sidewalls positioned on opposite sides of the center portion;
   positioning the air filter section so that a first side of the air filter section is located above a first frame segment;
   moving the air filter section into a framing form so that the first side of the air filter section contacts the first frame segment;
   moving a second frame segment into contact with a second side of the air filter section and moving a third frame segment into contact with a third side of the air filter section, the second and third frame segments attached to opposite ends of the first frame segment, the movement of the second and third frame segments caused by the movement of the air filter section into the framing form;
   moving a fourth frame segment into contact with a fourth side of the air filter section; and
   attaching sidewalls of the air filter section support structures to sidewalls of corresponding frame segments to form a hollow channel between the support structure and the corresponding frame segment along the pleated sides of the filter media.

14. The method of claim 13, wherein the pleated filter media has a first face and a second face, and wherein at least one strut is attached to peaks on the first face of the pleated filter media, and at least one strut is attached to peaks on the second face of the pleated filter media.

15. The method of claim 13, wherein the frame assembly has a tab section attached to a first end of the frame assembly; and the method further comprising:

attaching the tab section to a second end of the frame assembly.

16. The method of claim 15, further comprising:

positioning the tab section between a frame segment and a side of the air filter section.

17. A method of attaching a frame to an air filter, comprising:

providing a filter slug comprising a filter media and reinforcing structures attached to opposite sides of the filter media, the support structures each having a center portion and sidewalls positioned on opposite sides of the center portion;

providing an unassembled frame having a plurality of segments, each of the segments having a center portion and sidewalls positioned on opposite sides of the center portion;

positioning a first frame segment between a first side of the filter slug and a frame form;

moving the filter slug into contact with the first frame segment and into the framing form;

rotating second and third frame segments into contact with second and third sides of the frame slug, the rotation of the frame segments caused by the movement of the filter slug and frame into the framing form;

rotating a fourth frame segment into contact with a fourth side of the filter slug; and permanently bonding the sidewalls of the filter slug reinforcing structures to the sidewalls of corresponding frame segments to form a hollow channel between the reinforcing structure and the corresponding frame segment.

18. The method of claim 17, wherein the filter media is pleated and has a first face and a second face, and wherein at least one support strut is attached to peaks on the first face of the pleated filter media, and at least one support strut is attached to peaks on the second face of the pleated filter media.

* * * * *